US009266373B2

(12) United States Patent
Carlson et al.

(10) Patent No.: US 9,266,373 B2
(45) Date of Patent: Feb. 23, 2016

(54) DUAL VESICULAR AND INFRARED IMAGING MEDIA

(75) Inventors: Steven Allen Carlson, Cambridge, MA (US); Benjamin Sloan, Newton, MA (US)

(73) Assignee: OPTODOT CORPORATION, Woburn, MA (US)

( * ) Notice: Subject to any disclaimer, the term of this patent is extended or adjusted under 35 U.S.C. 154(b) by 400 days.

(21) Appl. No.: 13/383,950

(22) PCT Filed: Jul. 15, 2010

(86) PCT No.: PCT/US2010/001993
§ 371 (c)(1),
(2), (4) Date: Feb. 14, 2012

(87) PCT Pub. No.: WO2011/008287
PCT Pub. Date: Jan. 20, 2011

(65) Prior Publication Data

US 2012/0135257 A1 May 31, 2012

Related U.S. Application Data

(60) Provisional application No. 61/270,910, filed on Jul. 15, 2009.

(51) Int. Cl.

| | |
|---|---|
| ***B32B 9/00*** | (2006.01) |
| ***B32B 9/04*** | (2006.01) |
| ***B32B 23/04*** | (2006.01) |
| ***B41M 5/46*** | (2006.01) |
| ***B41M 5/36*** | (2006.01) |
| ***B41M 5/28*** | (2006.01) |
| *B41M 3/14* | (2006.01) |

(52) U.S. Cl.
CPC ............... *B41M 5/465* (2013.01); *B41M 5/288* (2013.01); *B41M 5/36* (2013.01); *B41M 3/14* (2013.01); *B41M 5/46* (2013.01); *Y10T 428/31971* (2015.04)

(58) Field of Classification Search
None
See application file for complete search history.

(56) References Cited

U.S. PATENT DOCUMENTS

| | | | | |
|---|---|---|---|---|
| 4,863,819 | A | 9/1989 | Drexler et al. | |
| 6,381,059 | B1 | 4/2002 | Carlson | |
| 6,589,451 | B1 | 7/2003 | Carlson | |
| 6,794,107 | B2 | 9/2004 | Shimazu et al. | |
| 7,715,095 | B2 | 5/2010 | Carlson et al. | |
| 2003/0206324 | A1* | 11/2003 | Carlson et al. | 359/244 |
| 2004/0081908 | A1* | 4/2004 | Shimazu et al. | 430/152 |
| 2004/0130771 | A1 | 7/2004 | Carlson | |
| 2006/0199105 | A1 | 9/2006 | Cahill | |
| 2007/0097510 | A1* | 5/2007 | Carlson | 359/589 |
| 2007/0272867 | A1* | 11/2007 | Tahon et al. | 250/361 R |
| 2008/0305407 | A1 | 12/2008 | Zwadlo et al. | |
| 2010/0104817 | A1 | 4/2010 | Carlson | |

FOREIGN PATENT DOCUMENTS

WO WO 2011/008287 1/2011

OTHER PUBLICATIONS

International Search Report and Written Opinion received in International Patent Application No. PCT/US2010/001993, 8 pages.
Supplementary European Search Report received in European Patent Application No. 10800166.0, 9 pages.

* cited by examiner

*Primary Examiner* — Coris Fung
(74) *Attorney, Agent, or Firm* — Finch & Maloney PLLC

(57) ABSTRACT

Provided is a laser imageable media that forms both a vesicular bubble image and an infrared image upon exposure to laser radiation. The laser imageable media comprises (1) a substrate, preferably a transparent plastic substrate, (2) an infrared absorbing layer comprising an infrared absorbing compound, preferably an aminium radical cation compound, that exhibits a reduction in infrared absorption when exposed to the laser radiation, and (3) a polymeric layer comprising an organic polymer, preferably nitrocellulose, overlying the infrared absorbing layer. The vesicular image on a transparent plastic substrate is readable with a visible scanner without the use of any reflective background material behind the transparent plastic substrate.

16 Claims, No Drawings

DUAL VESICULAR AND INFRARED IMAGING MEDIA

RELATED APPLICATIONS

This is a national stage filing under 35 U.S.C. 371 of PCT Application No. PCT/US2010/001993, filed Jul. 15, 2010, and claims benefit under 35 U.S.C. §119(e) of U.S. Provisional Patent Application No. 61/270,910, filed Jul. 15, 2009. The entireties of each of the above-referenced patent applications are incorporated herein by reference.

FIELD OF THE INVENTION

The present invention relates generally to the field of imaging media and methods for imaging of media. More particularly, this invention pertains to imaging media that form both a vesicular image and an infrared image upon exposure to laser imaging radiation.

BACKGROUND

There is an increasing need for security markings that are unique and difficult to counterfeit, compatible with existing machine reading systems, and low in cost. Particularly, there is a need for nearly invisible and colorless security markings that still are readable in the visible region with conventional visible machine readers, such as a visible bar code scanner, and that can be read on transparent backings or substrates, such as found in clear packaging materials.

There are nearly invisible and colorless security markings that have infrared absorption, are imageable with infrared lasers, and are readable in the infrared region with conventional infrared machine readers, such as an infrared bar code scanner or camera, as for example described in U.S. Pat. Nos. 6,381,059 and 6,589,451, both to Carlson. However, these security markings on a transparent backing or substrate, as in a clear packaging or in a clear card, are not readable in the visible region with existing visible bar code scanners and other visible readers.

It would be advantageous if a laser imageable media were available for use in a variety of nearly invisible and colorless security markings on transparent substrates that are easy to read with conventional visible bar code scanners. It would be particularly advantageous if this laser imageable media had the flexibility to also form an infrared image that is easy to read with conventional infrared bar code scanners.

SUMMARY OF THE INVENTION

One aspect of the present invention pertains to a laser imageable media comprising (1) a substrate, (2) an infrared absorbing layer comprising an infrared absorbing compound that exhibits a reduction in infrared absorption in the 700 to 1000 nm wavelength region upon exposure to laser imaging radiation, and (3) a polymeric layer overlying the infrared absorbing layer, wherein the polymeric layer comprises an organic polymer, and wherein both a vesicular image and an infrared image are formed in the media upon exposure to laser imaging radiation. In one embodiment, the infrared absorbing compound comprises an aminium radical cation compound. In one embodiment, the aminium radical cation compound is selected from the group consisting of a salt of a tetrakis (phenyl)-1,4-benzenediamine radical cation and a salt of a tris(phenyl)-aminium radical cation.

In one embodiment of the laser imageable media of this invention, the optical density of the infrared absorbing layer is less than 0.4 in the wavelength region from 700 to 2000 nm. In one embodiment, the optical density of the infrared absorbing layer is less than 0.1 in the wavelength region from 450 to 650 nm. In one embodiment, the infrared absorbing layer comprises greater than 50% by weight of the infrared absorbing compound. In one embodiment, the laser imaging radiation is an infrared radiation in the wavelength range of 700 to 1600 nm. In one embodiment, the laser imaging radiation is a visible radiation. In one embodiment, the infrared absorbing layer comprises an organic polymer. In one embodiment, the organic polymer is nitrocellulose.

In one embodiment of the laser imageable media of the present invention, the polymeric layer comprises nitrocellulose. In one embodiment, the substrate is a transparent plastic substrate. In one embodiment, the substrate is a transparent plastic substrate and the vesicular image formed in the media is readable with a visible scanner. In one embodiment, the vesicular image is a bar code image and the visible scanner is a visible bar code scanner. In one embodiment, the substrate is a transparent plastic substrate and the infrared image formed in the media is readable with an infrared scanner. In one embodiment, the infrared image is readable when the media in placed in contact with an infrared reflective substrate and read from the side of the media opposite to the infrared reflective substrate. In one embodiment, the infrared image is a bar code image and the infrared scanner is an infrared bar code scanner.

Another aspect of the invention relates to a laser imageable media comprising (1) a transparent substrate, (2) an infrared absorbing layer comprising an aminium radical cation compound that exhibits a reduction in infrared absorption in the 700 to 1000 nm wavelength region upon exposure to laser imaging radiation, and (3) a polymeric layer overlying the infrared absorbing layer, wherein the polymeric layer comprises nitrocellulose, wherein both a vesicular image and an infrared image are formed in the media upon exposure to laser imaging radiation. In one embodiment, the vesicular image formed in the media is readable with a visible scanner. In one embodiment, the vesicular image is a bar code image and the visible scanner is a visible bar code scanner.

DETAILED DESCRIPTION OF THE INVENTION

The laser imageable media of the present invention provide a flexible and effective approach to making security markings that are nearly invisible and colorless, yet can be easily read in the visible and in the infrared with existing visible and infrared scanners, such as bar code scanners. This is particularly useful in marking clear transparent plastics and packaging with visible machine readable markings for product security, authentication, and tracking.

One aspect of the present invention pertains to a laser imageable media comprising (1) a substrate, (2) an infrared absorbing layer comprising an infrared absorbing compound that exhibits a reduction in infrared absorption in the 700 to 1000 nm wavelength region upon exposure to laser imaging radiation, and (3) a polymeric layer overlying the infrared absorbing layer, wherein the polymeric layer comprises an organic polymer, and wherein both a vesicular image and an infrared image are formed in the media upon exposure to laser imaging radiation. The term "vesicular image," as used herein, means that the image comprises small bubbles or gas vesicles that scatter light. One type of imaging media utilized for microfilm is vesicular microfilm comprising an imaging layer containing a diazonium compound. Upon irradiation with ultraviolet radiation, the vesicular imaging layer produces nitrogen gas that forms gas vesicles or bubbles in the polymer matrix of the imaging layer. For example, U.S. Pat. No. 6,794,107 to Shimazu, et al., describes a vesicular imaging layer for use as a masking layer for making flexographic printing plates.

Aminium Radical Cation Compounds

The term "aminium radical cation compound," as used herein, pertains to an organic arylamine compound that comprises at least one free unpaired electron on a nitrogen atom, in the ground state of the organic compound. The word "cation," as used herein, pertains to a positively charged atom or group of atoms in a molecule, such as, for example, a positively charged nitrogen atom. The word "anion," as used herein, pertains to a negatively charged atom or group of atoms in a molecule, such as, for example, a negatively charged hexafluoroantimonate ($SbF_6^-$). It should be noted that the free unpaired electrons and the positive charges of the aminium radical cation compounds may be localized on a single atom or shared among more than one atom.

Examples of suitable infrared absorbing compounds for the laser imageable media of this invention include, but are not limited to, salts of aminium radical cations, such as, for example, tris (p-dibutylaminophenyl) aminium hexafluoroantimonate, which is commercially available as IR-99, a trade name for a dye available from Sperian Protection, Smithfield, R.I. An equivalent chemical name for IR-99, used interchangeably herein, is the hexafluoroantimonate salt of N,N-dibutyl-N',N'-bis[4-(dibutylamino)phenyl]-1,4-benzenediamine radical cation. IR-99 is known to be a stable material that may exist in a layer of material, such as in a polymeric coating, under normal room conditions for an extended period of time. Another suitable salt of an aminium radical cation compound is IR-165, which is a trade name for a dye available from Sperian Protection, Smithfield, R.I. IR-165 is the hexafluoroantimonate salt of a tetrakis(phenyl)-1,4-benzenediamine radical cation. IR-165 is likewise known to be stable in the dry powder form and in a layer of material, such as in a polymer-containing coating, under ambient room conditions for extended periods of time, such as for many years.

Coatings comprising aminium radical cation compounds have been found to exhibit high levels of reflectance in the infrared, as described in U.S. Pat. No. 7,151,626, to Carlson, and in U.S. Pat. Publ. Applic. No. 20070097510 to Carlson et al. Layers comprising IR-165 have a much lower absorption in the 400 to 700 nm wavelength region of the visible than does IR-99 for a comparable amount of infrared blocking, and thus are preferred for security marking applications where high visible transparency and very low color are desired.

The terms "infrared," "infrared region," "near-infrared wavelength region," "near-infrared wavelength," and "near-infrared," are used interchangeably herein, and pertain to wavelengths from 700 nm to 2500 nm. The terms "visible wavelength region," "visible wavelength," "visible region," and "visible," are used interchangeably herein and pertain to wavelengths from 400 to 700 nm.

Suitable salts of organic radical cations for the security marking and other applications of this invention include, but are not limited to, salts of an aminium radical cation compound. The choice of the counteranion for the salt depends on a variety of factors such as, for example, the ease and cost of applying the infrared blocking layer and the required stability of any infrared blocking layers where the organic radical cation salt is utilized, against degradation by oxygen, moisture, and photon exposures.

Chart 1 shows the chemical structure of IR-99, a representative aminium radical cation compound for the laser imageable media of this invention. IR-99 is an example of a salt of a tris (4-dialkylaminophenyl) aminium radical cation.

Chart 1

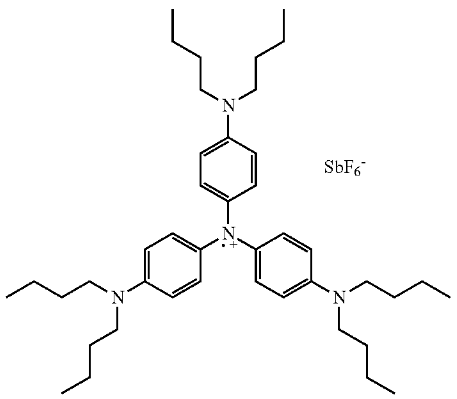

IR-99 for Laser Imageable Media

It can be seen in Chart 1 that IR-99 is an aminium radical cation compound with a single free electron and a single positive charge shown on one of the nitrogen atoms. It is present in a salt form with a hexafluoroantimonate anion in this case.

In one embodiment of the laser imageable media of this invention, the infrared absorbing compound comprises an aminium radical cation compound. In one embodiment, the aminium radical cation compound is selected from the group consisting of a salt of a tetrakis(phenyl)-1,4-benzenediamine radical cation and a salt of a tris(phenyl)-aminium radical cation.

In one embodiment of the laser imageable media of this invention, the aminium radical cation compound is a salt of an aminium radical cation, wherein the anion of the salt is selected from the group consisting of hexafluoroantimonate and hexafluorophosphate. In one embodiment, the aminium radical cation compound is a salt of a tetrakis(phenyl)-1,4-benzenediamine radical cation. In one embodiment, the aminium radical cation compound is a salt of a tris(phenyl)-aminium radical cation.

In one embodiment of the laser imageable media of this invention, the optical density of the infrared absorbing layer prior to laser imaging is preferably less than 0.8, and more preferably less than 0.4, in the wavelength region from 700 to 2000 nm, although the optical density of the infrared absorbing layer from 700 to 2000 nm may be greater than 0.8. In one embodiment, the optical density of the infrared absorbing layer prior to laser imaging is preferably less than 0.2, and more preferably less than 0.1, in the wavelength region from 450 to 650 nm, although the optical density of the infrared absorbing layer from 450 to 650 nm may be greater than 0.2. These low optical densities in the 450 to 650 nm range make the infrared absorbing layer nearly invisible and colorless, as is typically desirable in security markings. In one embodiment, the infrared absorbing layer comprises greater than 30% by weight, and preferably greater than 50% by weight, of the infrared absorbing compound. These high loadings of the infrared absorbing compound in the infrared absorbing layer are useful in effectively building up the heat from absorption of the laser radiation and efficiently causing the dual vesicular and infrared imaging of the media. In one embodiment, the laser imaging radiation is an infrared radiation in the wavelength range of 700 to 1600 nm. Many of the infrared absorbing aminium radical cation compounds, such as IR-165, absorb across the 700 to 1600 nm wavelength range and may be imaged by infrared laser radiation at all infrared wavelengths where the aminium radical cation compounds absorb. In one embodiment, the laser imaging radiation is a visible radiation. In one embodiment, the infrared absorbing layer comprises an organic polymer, such as a urethane polymer. In one embodiment, the infrared absorbing layer comprises nitrocellulose.

In one embodiment of the laser imageable media of the present invention, the polymeric layer comprises nitrocellulose. In one embodiment, the substrate is a transparent plastic substrate. In one embodiment, the substrate is a transparent plastic substrate and the vesicular image formed in the media is readable with a visible scanner. In one embodiment, the vesicular image is a bar code image and the visible scanner is a visible bar code scanner. In one embodiment, the substrate is a transparent plastic substrate and the infrared image formed in the media is readable with an infrared scanner. In one embodiment, the infrared image is readable when the media in placed in contact with an infrared reflective substrate and read from the side of the media opposite to the infrared reflective substrate as the background material. In one embodiment, the infrared image is a bar code image and the infrared scanner is an infrared bar code scanner.

Another aspect of the invention relates to a laser imageable media comprising (1) a transparent substrate, (2) an infrared absorbing layer comprising an aminium radical cation compound that exhibits a reduction in infrared absorption in the 700 to 1000 nm wavelength region upon exposure to laser imaging radiation, and (3) a polymeric layer overlying the infrared absorbing layer, wherein the polymeric layer comprises nitrocellulose, wherein both a vesicular image and an infrared image are formed in the media upon exposure to laser imaging radiation. In one embodiment, the vesicular image formed in the media is readable with a visible scanner. In one embodiment, the vesicular image is a bar code image and the visible scanner is a visible bar code scanner.

What is claimed is:

1. A laser imageable media comprising (1) a transparent plastic substrate, (2) an infrared absorbing layer comprising greater than 50% by weight of an infrared absorbing compound that exhibits a reduction in infrared absorption in the 700 to 1000 nm wavelength region upon exposure to laser imaging radiation, and (3) a polymeric layer directly adjacent to said infrared absorbing layer, wherein said polymeric layer comprises an organic polymer, and wherein both a vesicular image and an infrared image are formed in said media upon exposure to laser imaging radiation and said vesicular image is readable with a visible scanner.

2. The media of claim 1, wherein said infrared absorbing compound comprises an aminium radical cation compound.

3. The media of claim 2, wherein said aminium radical cation compound is selected from the group consisting of a salt of a tetrakis(phenyl)-1,4-benzenediamine radical cation and a salt of a tris(phenyl)-aminium radical cation.

4. The media of claim 1, wherein the optical density of said infrared absorbing layer is less than 0.4 at all wavelengths within a region from 700 to 2000 nm.

5. The media of claim 4, wherein the optical density of said infrared absorbing layer is less than 0.1 at all wavelengths within a region from 450 to 650 nm.

6. The media of claim 1, wherein said laser imaging radiation is an infrared radiation in a wavelength range of 700 to 1600 nm.

7. The media of claim 1, wherein said laser imaging radiation is a visible radiation.

8. The media of claim 1, wherein said infrared absorbing layer comprises an organic polymer.

9. The media of claim 1, wherein said polymeric layer comprises nitrocellulose.

10. The media of claim 1, wherein said vesicular image is a bar code image and said visible scanner is a visible bar code scanner.

11. The media of claim 1, wherein said infrared image formed in said media is readable with an infrared scanner.

12. The media of claim 11, wherein said infrared image is readable when said media is placed in contact with an infrared reflective substrate and read from the side of said media opposite to said infrared reflective substrate.

13. The media of claim 12, wherein said infrared image is a bar code image and said infrared scanner is an infrared bar code scanner.

14. A laser imageable media comprising (1) a transparent substrate, (2) an infrared absorbing layer comprising greater than 50% by weight of an infrared absorbing compound comprising an aminium radical cation compound that exhibits a reduction in infrared absorption in the 700 to 1000 nm wavelength region upon exposure to laser imaging radiation, and (3) a polymeric layer directly adjacent to said infrared absorbing layer, wherein said polymeric layer comprises nitrocellulose, and wherein both a vesicular image and an infrared image are formed in said media upon exposure to laser imaging radiation and said vesicular image is readable with a visible scanner.

15. The media of claim 14, wherein said vesicular image is a bar code image and said visible scanner is a visible bar code scanner.

16. A laser imageable media comprising (1) a transparent plastic substrate, (2) an infrared absorbing layer comprising greater than 50% by weight of an infrared absorbing compound that exhibits a reduction in infrared absorption in the 700 to 1000 nm wavelength region upon exposure to laser imaging radiation, wherein the optical density of said infrared absorbing layer is less than 0.4 at all wavelengths within a region from 700 to 2000 nm, and (3) a polymeric layer directly adjacent to said infrared absorbing layer, wherein said polymeric layer comprises an organic polymer, wherein both a vesicular image and an infrared image are formed in said media upon exposure to laser imaging radiation and said vesicular image is readable with a visible scanner.

* * * * *